United States Patent
Mikhail et al.

(10) Patent No.: US 7,042,110 B2
(45) Date of Patent: May 9, 2006

(54) VARIABLE SPEED DISTRIBUTED DRIVE TRAIN WIND TURBINE SYSTEM

(75) Inventors: Amir S. Mikhail, Santa Barbara, CA (US); Kevin L. Cousineau, Lompoc, CA (US); Lawrence H. Howes, Santa Barbara, CA (US); William Erdman, Orinda, CA (US); William Holley, Pleasanton, CA (US)

(73) Assignee: Clipper Windpower Technology, Inc., Carpenteria, CA (US)

( * ) Notice: Subject to any disclaimer, the term of this patent is extended or adjusted under 35 U.S.C. 154(b) by 110 days.

(21) Appl. No.: 10/773,851

(22) Filed: Feb. 4, 2004

(65) Prior Publication Data

US 2005/0012339 A1    Jan. 20, 2005

Related U.S. Application Data

(60) Provisional application No. 60/468,899, filed on May 7, 2003.

(51) Int. Cl.
*H02P 9/00* (2006.01)
*F03D 7/00* (2006.01)
*F03D 9/00* (2006.01)
*G05D 11/00* (2006.01)
*H02J 3/00* (2006.01)

(52) U.S. Cl. .................. 290/44; 290/55; 290/40 C
(58) Field of Classification Search .................. 290/44, 290/55, 40 C
See application file for complete search history.

(56) References Cited

U.S. PATENT DOCUMENTS

| | | | |
|---|---|---|---|
| 3,753,069 A * | 8/1973 | Newton | 318/440 |
| 4,427,897 A | 1/1984 | Migliori | 290/44 |
| 4,951,769 A * | 8/1990 | Kawamura | 180/65.4 |
| 4,952,774 A * | 8/1990 | Sugimoto et al. | 219/133 |
| 4,973,896 A * | 11/1990 | Shiga et al. | 322/28 |
| 4,992,920 A * | 2/1991 | Davis | 363/36 |
| 5,017,857 A * | 5/1991 | Fox | 322/25 |
| 5,083,039 A | 1/1992 | Richardson et al. | 290/44 |
| 5,198,971 A * | 3/1993 | Recker et al. | 363/71 |
| 5,339,235 A * | 8/1994 | Shekhawat et al. | 363/43 |
| 5,368,116 A * | 11/1994 | Iijima et al. | 180/65.4 |
| 5,473,228 A * | 12/1995 | Nii | 318/158 |
| 5,532,525 A * | 7/1996 | Kaiser et al. | 307/64 |
| 5,545,928 A * | 8/1996 | Kotani | 290/40 C |
| 5,546,742 A * | 8/1996 | Shekhawat et al. | 60/788 |
| 5,550,445 A * | 8/1996 | Nii | 318/153 |
| 5,610,452 A * | 3/1997 | Shimer et al. | 307/89 |
| 5,612,581 A * | 3/1997 | Kageyama | 307/64 |

(Continued)

Primary Examiner—Darren Schuberg
Assistant Examiner—Pedro J. Cuevas
(74) Attorney, Agent, or Firm—Owen L. Lamb (57) ABSTRACT

A variable speed wind turbine employing a rotor connected to a multiplicity of synchronous generators with wound field or permanent magnet rotors. A passive rectifier and an inverter are used for power transfer back to the grid. A Turbine Control Unit (TCU) commands a required generator torque based on rotor speed and power output of the turbine inverters. Torque is controlled by regulating the DC current by control of the inverter. A main-shaft-damping filter is provided by measurement of the DC bus voltage. In high winds the turbine remains at a constant average output power through a constant torque command and a varying pitch command to a rotor pitch servo system. A set point is fixed at the inverter output such that output VAR load is minimized running the turbine at very nearly unity power factor. Dynamic VAR and power factor control is provided by a separate VAR apparatus.

36 Claims, 4 Drawing Sheets

U.S. PATENT DOCUMENTS

| | | | |
|---|---|---|---|
| 5,646,458 A * | 7/1997 | Bowyer et al. | 307/67 |
| 5,652,485 A * | 7/1997 | Spiegel et al. | 318/147 |
| 5,745,356 A * | 4/1998 | Tassitino et al. | 363/71 |
| 5,767,591 A * | 6/1998 | Pinkerton | 307/64 |
| 5,929,537 A * | 7/1999 | Glennon | 307/46 |
| 5,939,798 A * | 8/1999 | Miller | 307/64 |
| 5,994,794 A * | 11/1999 | Wehrlen | 307/66 |
| 6,137,187 A | 10/2000 | Mikhail et al. | 290/44 |
| 6,184,593 B1 * | 2/2001 | Jungreis | 307/64 |
| 6,304,468 B1 * | 10/2001 | Ichinose et al. | 363/55 |
| 6,339,316 B1 * | 1/2002 | Eguchi et al. | 322/59 |
| 6,420,795 B1 | 7/2002 | Mikhail et al. | 290/44 |
| 6,420,796 B1 * | 7/2002 | Lagerwey | 290/44 |
| 6,469,401 B1 * | 10/2002 | Beeson et al. | 290/1 A |
| 6,487,096 B1 * | 11/2002 | Gilbreth et al. | 363/35 |
| 6,512,966 B1 * | 1/2003 | Lof et al. | 700/291 |
| 6,577,097 B1 * | 6/2003 | Krefta et al. | 318/801 |
| 6,583,995 B1 * | 6/2003 | Kalman et al. | 363/35 |
| 6,586,914 B1 * | 7/2003 | Garrigan et al. | 322/28 |
| 6,600,240 B1 | 7/2003 | Mikhail et al. | 307/85 |
| 6,603,672 B1 * | 8/2003 | Deng et al. | 363/37 |
| 6,661,110 B1 * | 12/2003 | Suzuki et al. | 290/40 C |
| 6,671,585 B1 * | 12/2003 | Lof et al. | 705/36 R |
| 6,694,438 B1 * | 2/2004 | Porter et al. | 713/300 |
| 6,724,097 B1 * | 4/2004 | Wobben | 290/44 |
| 6,737,762 B1 * | 5/2004 | Koenig | 307/48 |
| 6,749,399 B1 * | 6/2004 | Heronemus | 416/41 |
| 6,771,522 B1 * | 8/2004 | Hayashi et al. | 363/71 |
| 6,784,564 B1 * | 8/2004 | Wobben | 290/44 |
| 6,784,565 B1 * | 8/2004 | Wall et al. | 290/52 |
| 6,788,029 B1 * | 9/2004 | Gabrys | 322/4 |
| 6,815,934 B1 * | 11/2004 | Colley | 322/47 |
| 6,848,407 B1 * | 2/2005 | Kobayashi et al. | 123/182.1 |
| 6,856,038 B1 * | 2/2005 | Rebsdorf et al. | 290/44 |
| 6,858,953 B1 * | 2/2005 | Stahlkopf | 290/44 |
| 6,859,018 B1 * | 2/2005 | Garrigan et al. | 322/28 |
| 6,870,279 B1 * | 3/2005 | Gilbreth et al. | 290/52 |
| 6,870,350 B1 * | 3/2005 | Garrigan et al. | 322/28 |
| 6,933,625 B1 * | 8/2005 | Feddersen et al. | 290/44 |
| 6,965,174 B1 * | 11/2005 | Wobben | 290/44 |
| 6,969,922 B1 * | 11/2005 | Welches et al. | 290/1 A |
| 6,969,926 B1 * | 11/2005 | Conlon | 290/55 |
| 6,975,925 B1 * | 12/2005 | Barnes et al. | 700/286 |
| 2004/0201221 A1 | 10/2004 | Mohlenkamp | 290/44 |

* cited by examiner

VARIABLE SPEED DISTRIBUTED DRIVE TRAIN WIND TURBINE SYSTEM

CROSS-REFERENCE TO RELATED APPLICATIONS

This application claims priority under 35 U.S.C. § 119(e) to U.S. Provisional Patent Application No. 60/468,899 Variable Speed Wind Turbine Technology, which was filed on May 7, 2003 and which is incorporated herein by reference.

This application is related to U.S. Pat. No. 6,304,002; U.S. Pat. No. 6,731,017; U.S. Pat. No. 6,653,744; U.S. patent application Ser. No. 10/426,287 of Kevin L. Cousineau entitled "Distributed Static VAR Compensation (DSVC) System For Wind And Water Turbine Applications" filed Apr. 30, 2003, and U.S. patent application Ser. No. 10/449,342 of Amir S. Mikhail and Edwin C. Hahlbeck entitled "Improved Distributed Power Train (DGD) with Multiple Power Paths" filed May 31, 2003, all of which are assigned to Clipper Windpower Technology, Inc. and are incorporated herein by reference.

BACKGROUND OF THE INVENTION

1. Field of the Invention

The invention relates to fluid-flow turbines, such as wind turbines under water current turbines, and to other prime movers, and more particularly to variable speed turbines employing multi-phase generators with power conversion technology for torque control and rotor blade pitch for turbine speed and load control.

2. Description of the Prior Art

The development of practical, wind-powered generating systems creates problems, which are unique and not encountered in the development of conventional power generating systems. These problems are similar in nature to under water current turbines, mining equipment and wind tunnel boring equipment. The natural variability of the wind affects the nature and quality of the electricity produced and the relationship between the velocity of the tip of a turbine blade and the wind velocity affects the maximum energy that may be captured from the wind. These issues together with mechanical fatigue due to wind variability have a significant impact on the cost of wind generated electricity.

Historically, wind turbines have been operated at constant speed. The power delivered by such a wind turbine is determined by the torque produced by blades and main shaft. The turbine is typically controlled by a power command signal, which is fed to a turbine blade pitch angle servo, referred herein as a Pitch Control Unit or PCU. This servo controls the pitch of the rotor blades and therefore the power output of the wind turbine. Because of stability considerations, this control loop must be operated with a limited bandwidth and, thus, is not capable of responding adequately to wind gusts. In this condition, main-shaft torque goes up and transient power surges occur. These power surges not only affect the quality of the electrical power produced, but they create significant mechanical loads on the wind turbine itself. These mechanical loads further force the capital cost of turbines up because the turbine structures must be designed to withstand these loads over long periods of time, in some cases 20–30 years.

To alleviate the problems of power surges and mechanical loads with constant speed wind turbines, the Wind Power industry has been moving towards the use of variable speed wind turbines. A variable speed wind turbine employs a converter between the generator and the grid. Because the turbine generator is now decoupled from the grid, the frequency and voltage at which the generator operates is independent of the constant voltage, constant frequency of the grid. This permits variable speed operation. Two classes of power converter have been employed in this application. The first is referred to as a full conversion system, which is inserted between the generator and grid as described. In this approach, the converter carries all of the generated power. An example of this type of system is described in U.S. Pat. No. 5,083,039, entitled "Variable Speed Wind Turbine", issued Jan. 21, 1992. In the second class, the converter is placed between a portion of the generator and the grid, usually the rotor circuit. This approach is used because the converter only needs to be sized for a portion of the total power. This is referred to as partial conversion and an example of this approach is described in U.S. Pat. No. 6,137,187, U.S. Pat. No. 6,420,795 and U.S. Pat. No. 6,600,240 all entitled "Variable Speed Wind Turbine Generator".

The variable speed wind turbine disclosed in U.S. Pat. No. 5,083,039 comprises a turbine rotor that drives a pair of AC squirrel cage induction generators with two respective power converters. The converters contain an active rectifier that controls the generator torque by means of a high-performance field-orientation method. The converter also contains an inverter section, which is synchronized to the AC line and controls the DC bus voltage by maintaining a power balance between the generator and the AC grid. The converter is inherently bi-directional and can pass power in both directions. The inverter section of the converter is capable of shifting the current waveform relative to the grid voltage and variable reactive power, or power factor can be controlled in this way. With an induction generator, this system requires an active rectifier as the magnetizing component of the generator must be supplied by the DC bus through proper control of the active rectifier.

U.S. Pat. Nos. 6,137,187, 6,420,795, and 6,600,240 describe a partial conversion variable speed system for use in wind turbines. The system comprises a wound rotor induction generator, a torque controller and a proportional, integral derivative (PID) pitch controller. The torque controller controls generator torque using field-oriented control (on the rotor) and the PID controller performs pitch regulation based on generator rotor speed. Like the U.S. Pat. No. 5,083,039 patent, power flow is bi-directional within the rotor of the generator and an active rectifier and grid inverter is used for the conversion process. The converter used in this system is rated at only a portion of the total turbine rating, with the rating depending on the maximum generator slip used in the turbine design. The converter controls the current and frequency in the rotor circuit only with a direct grid connection to the utility. Because the generator operates at sub-synchronous and super-synchronous speeds, the converter must also be bi-directional just as in the U.S. Pat. No. 5,083,039 case. In addition to the converter controlling torque in this system, the converter is capable of controlling system reactive power or power factor. This is accomplished by under/over exciting the generator rotor circuit along its magnetization axis. The converter is placed off line from the stator connection to the grid and only handles rotor power input and output. The control of the pitch system is also covered in this patent. The pitch system simply responds to a speed error through a proportional, integral, derivative controller (PID) to call for the correct pitch angle to maintain speed. A further advantage of variable speed wind turbines is that through the use of their solid-state power conversion technology, utility interconnection power quality requirements have been improved beyond that achievable with constant speed wind turbines. Variable speed turbines have inherently better power regulation qualities resulting in less line voltage flicker. This allows these machines to meet demanding power quality standards such as IEEE 519.

By properly controlling the torque and pitch on the variable speed turbine, an increase in energy capture and load reduction is possible. This, together with the improved power quality, makes the variable speed turbine economically attractive for electrical power generation.

SUMMARY OF THE INVENTION

Briefly, the present invention relates to a variable speed wind turbine having at least one or more blades, one or more generators, one or more power conversion systems for actively converting the generator variable frequency and variable voltage into fixed frequency, and fixed voltage for consumption by the interconnected utility grid. The turbine contains a servomechanism necessary to control the turbine blade pitch angle, called herein the Pitch Control Unit or PCU, and a means of controlling generator torque through commands send to a Generator Control Unit or GCU. A Turbine Control Unit or TCU is responsible for coordinating the control of generator torque and blade pitch in a way which maximizes the energy capture of the turbine while minimizing the mechanical loads.

An advantage of the invention is that the power conversion system is a unidirectional passive rectifier/active inverter. The passive rectifier permits a higher efficiency than previous active rectifiers. This conversion system together with a high efficiency synchronous generator provide for very high total drive train efficiency. In the multiple generator implementation described herein, efficiency is further enhanced at low power levels by staging generators and allowing these generator to operate at or near their optimal efficiency.

A further advantage of the invention is that the power conversion system or GCU is capable of responding to torque commands from the TCU and providing the requested torque without the use of any field orientation or other sophisticated control algorithm. The simplicity of this approach allows the converter to control the generator torque without the use of a generator position encoder or generator speed tachometer, which enhances reliability and eliminates tachometer related failure modes. In fact the use of synchronous generators allows the generator to be used as a system tachometer. In this capacity with multiple generators, a secondary, redundant tachometer is inherently provided as required by codes and certification bodies using only the generators already a part of the system.

The invention also allows for main-shaft damping without the use of a generator tachometer. Because synchronous generators are used with a passive rectifier, the main-shaft resonant frequency due to blade inertia, compliant main-shaft inertia and bull gear inertia, can be sensed in the DC link voltage. The DC bus voltage is monitored and passed through a band pass filter which is tuned at the main-shaft resonant frequency. The filtered signal can then be scaled and applied to the inverter system torque command and active damping is achieved.

In accordance with an aspect of the invention, the inverter runs at a fixed power factor angle near, or at unity, and is not controllable. This is advantageous as operating the wind turbines at a unity power factor reduces the balance of system costs such as the cable running to the turbines within a wind plant. For conditions where wind plant power factor needs to be varied dynamically, the function is performed with a separate power factor apparatus at the substation connection of a group of turbines. This provides the lowest-cost wind-plant design, as there is no over sizing of in-plant balance of system items such as pad-mount transformers and conductors. This normal increased-sized requirement is moved to the substation. With this turbine design there is no incremental cost associated with a requirement for over-sized conductors and transformers.

In accordance with an aspect of the invention the large, protection coordinated, synchronous reactance in the generators prevent high fault currents from occurring and significantly simplify the protective functions associated with running DC pendant cables down the tower. In the past, DC pendant cables were dismissed because of the prohibitive cost of protective switchgear and functions created by high power DC power transfer. The high reactance (300% fault current for a 33% synchronous reactance) fundamentally limits the available fault current and DC pendant cables become practical. Careful co-ordination of the generators' reactance and DC pendant cable sizing permit the transfer of high power over DC pendant cables and reduce the total amount of copper being used in the pendant cables. Thus power may be generated and rectified in the nacelle and the rest of the power conversion system may be placed at the base of the tower.

In accordance with a further aspect of the invention, the TCU controls the turbine blade pitch angle via the Pitch Control Unit (PCU) as well as the generator torque via the Generator Control Unit (GCU). The TCU provides a complicated, coordinated control function to both of these elements, and does so in a way, which maximizes the energy capture of the turbine while minimizing the mechanical loads. A description of how this is accomplished is provided in the detailed description. The TCU uses many necessary inputs to complete this coordination function between torque and pitch. Typical TCU inputs include turbine speed, blade pitch angle, tower acceleration (vibration), nacelle acceleration (nacelle vibration), wind speed, wind direction, wind turbulence, nacelle position, AC line parameters, DC bus voltage, generator voltage, power output, reactive power output, and others. Loads which are controlled and mitigated by the TCU include tower vibration, nacelle vibration, generator torque, and blade loads.

A summary of advantages of the present invention include:
1) Very high conversion efficiency generator+converter,
2) Simple unidirectional power converter system,
3) Simple torque control which does not depend on field orientation or tachometry,
4) Fixed power factor at the wind turbine, controllable at the wind plant aggregated level,
5) Coordinated control of pitch and torque to control all loads in aggregate,
6) Use of the generator(s) as a system tachometer(s),
7) Use of the converter DC bus to dampen main shaft and other mechanical resonant modes,
8) Fault coordinated DC pendant cables,
9) Generator and system redundancy,
10) Staged operation of generators for highest possible efficiency even at low output power.

BRIEF DESCRIPTION OF THE DRAWINGS

The invention and its mode of operation will be more fully understood from the following detailed description when taken with the appended drawings in which.

DETAILED DESCRIPTION OF THE INVENTION

Figure 1:
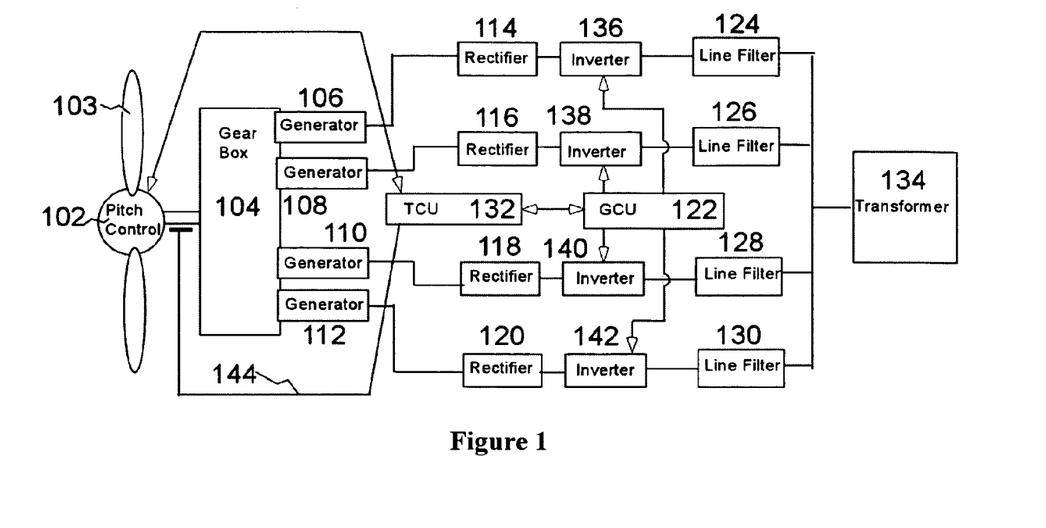
FIG. 1 is a block diagram of the variable speed wind turbine in accordance with the present invention highlighting the key turbine elements.

The variable-speed wind-turbine generator system is broadly shown in FIG. 1. There are six basic components of the system: Firstly a turbine drive train including a rotor hub mounted pitch servo system or PCU 102, blade rotor 103, distributed generation gearbox 104 and four permanent magnet generators 106, 108, 110, 112; secondly generator rectifier units 114, 116, 118, 120; thirdly a control system comprising a generator control unit (GCU) 122 and a turbine control unit (TCU) 132; fourthly four independent inverters, 136, 138, 140, and 142; fifthly individual line filters for each converter, 124, 126, 128, 130; and sixthly a pad-mount transformer, 134. Additionally shown in FIG. 1 is a sensor for measuring turbine speed on the low speed shaft, 144. It should be noted that for the purposes of illustration a system using four independent power conversion systems including generator, filter, inverter, rectifier, etc. is illustrated herein. A turbine using a greater or smaller number of independent power conversion systems, including a system using a single power conversion system, is conceived and included within the scope of the disclosed invention.

The turbine comprises one or more rotor blades 103 connected, via a rotor hub mounted pitch-angle servo (PCU) 102, which is powered through slip rings. While the pitch system is described as utilizing a servo drive located in the wind turbine's hub, it is within the scope of the invention that the pitch system could alternatively utilize a hydraulic, pneumatic, or other type of pitch actuator and the pitch actuator could be located in the nacelle of the turbine rather than in the hub. The hub is mechanically connected to the turbine main-shaft, which transmits the turbine's torque. The turbine shaft is coupled via a gearbox 104 and some suitable coupling device to, in this example, four permanent magnet or wound field synchronous generators 106, 108, 110, 112.

The Electrical Generating Systems Association (AGSA) defines a synchronous generator as follows:

A synchronous alternating-current machine that transforms mechanical power into electric power. NOTES: (1) A synchronous machine is one in which the speed of normal operation is exactly proportional to the frequency of the system to which it is connected. (2) Unless otherwise stated, it is generally understood that a synchronous generator (or motor) has field poles excited with direct current or permanent magnets. Copyright© 1998 by Electrical Generating Systems Association.

It is therefore understood by those skilled in the art that a synchronous generator has field poles excited with direct current or permanent magnets. For a wound field synchronous generator, an exciter is employed to supply excitation to the generator rotor field such that the field is excited with a constant field current. For a permanent magnet synchronous generator, an external exciter is not necessary because the permanent magnets supply the excitation. In this specification, the term "synchronous generator" is used to include a synchronous generator selected from a group consisting of (1) wound field synchronous generators wherein an exciter field is excited with a constant current and (2) permanent magnet synchronous generators.

The generator electrical output is connected to the rectifiers, 114, 116, 118, and 120, which convert the electrical power to DC voltage and current. The DC power is then transmitted to the inverters, 136, 138, 140, and 142. The inverter regulates the DC current and by doing so, the generator torque is controlled. The inverter regulates this DC current by synchronizing to the grid and by supplying unity power factor current into the grid system. The control of the inverters is provided by a generator control unit (GCU) 122. The GCU, 122 takes inputs such as grid voltage, DC bus voltage, grid current, and commands such as torque level from a Turbine Control unit (TCU) 132. These commands are converted into pulse-width-modulated (PWM) signals which tell switching devices (such as Insulated-Gate-Bipolar-Transistors, IGBTs, Metal-Oxide-Semicomductor-Field-Effect-Transsitors, MOSFETs, , Gate-Turn-Off devices, GTOs, or Silicon-Controled-Rectifiers or SCRs' etc) in the inverter when to turn on and off.

These switches are controlled in such a way as to maintain regulated DC current. Line filters, 124, 126, 128, 130 are then used to reduce any harmonics that may have been generated by the inverter before passing power to a pad-mount transformer 134.

The TCU 132 and GCU 122 in FIG. 1 work together to stage the generators 106, 108, 110, 112, when the turbine is operating at less than full power rating. The controller brings each generator of the plurality of synchronous generators in the turbine online sequentially in the event of low energy conditions of the source of energy (wind, water, etc.) to improve system efficiency at low power. The controller may optionally alternate the sequence in which the controller shifts the order in which said generators are brought online such that each generator receives substantially similar utilization.

Figure 2:
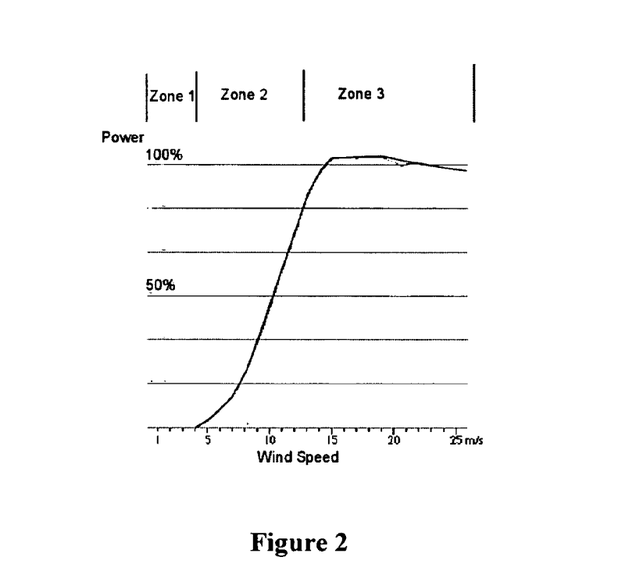
FIG. 2 is a figure of the power curve identifying different control zones.

This can be seen in FIG. 2 as the area of a power curve labeled Zone 2 where the amount of power produced is directly related to wind speed. The TCU is initiated with a master and slave selection. For example, upon initiation, generator 106 may be selected as the master generator and generators 108, 110, and 112 would respectively be slave 1, slave 2, and slave 3. If this is the initiation sequence then at very low power levels at the beginning of Zone 2 only the master generator would produce power. As the turbine comes up the power curve, slave 1 would be brought on line, then slave 2, and finally slave 3 would be brought on line as full power is achieved through Zone 3. The exact set points as to when a generator would come on line and when it would be dropped off would depend on a specific generator design and other system parameters. One of ordinary skill in the art would be capable of selecting appropriate set points for a specific generator and wind turbine design. The TCU also provides hysteresis as to when a generator comes on line and when it drops off. This prevents a generator from constantly be energized and de-energized which would reduce the life of certain components in the power conversion system. In addition to staging generators, the TCU receives operational time and power levels on the four generators from the GCU and after a period of time and power levels, the TCU shifts the designated master, slave 1, 2, 3, designation. This is done so as not to accumulate a disproportional number of hours on any one generator. The algorithm used for switching the designators is essentially an accumulated kWh calculation. However, other time or power relationships can be applied to determine the master and slave generators where specific equipment dictates.

The locations of the elements in FIG. 1 are not critical to the operation of the invention. For example, in one implementation, the rectifiers are placed up-tower and the DC voltage and current are run over approximately 200 to 300 feet of conductors to an inverter located at ground level below the turbine. Likewise, the location of the line filters and pad-mount transformers are not critical to the invention. The GCU does need to be mounted in the inverter cabinet to keep pulse-width-modulated signals as short as possible. Also, the TCU is typically mounted up-tower where the various sensors are located. This is done to prevent running the sensor leads down the tower over long distances.

The preferred approach in the invention is to place the passive rectifier up-tower and convert the synchronous generator AC voltage to DC. This results in a higher operating voltage on the pendant cables and a lower total quantity of cables as each generator/rectifier now has two conductors associated with it rather than three conductors each. The DC pendant cables are only possible because of the coordinated high impedance of the synchronous generator, which limits the DC fault current in the event of a ground or pendant cable fault. The GCU, which senses the DC bus voltage and current, senses this fault condition and brings the turbine to zero speed very quickly. While this takes a finite amount of time, the current does not build up as it would with a low impedance case and the shutdown is very controlled and orderly.

Figure 3:
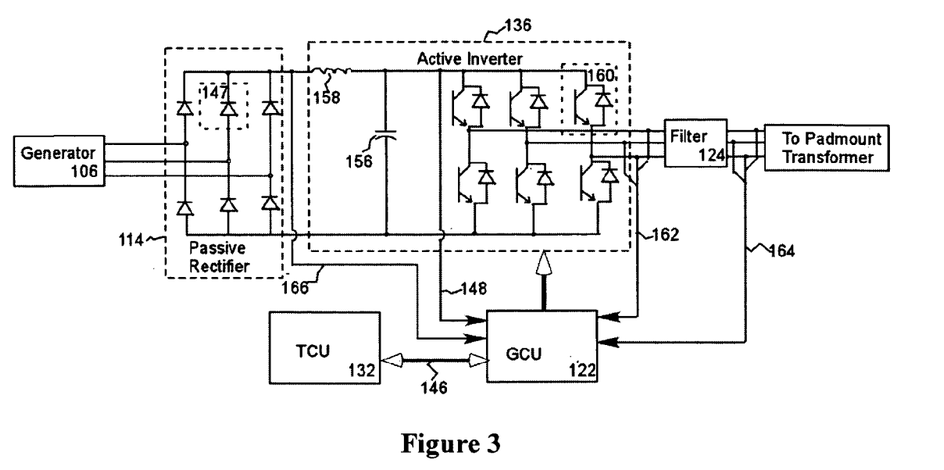
FIG. 3 is a detailed diagram of the power converter system.

FIG. 3 is a detailed depiction of one of the power conversion systems from FIG. 1. It includes a generator 106, rectifier 114, inverter 136, line filter 124, the GCU 122 and the TCU 132 for discussion purposes. The synchronous generator 106 rotates due to the aerodynamic torque caused by wind passing over the rotor blades at a given rotor pitch angle. This torque causes the generator 106 to accelerate. As the generator speeds up, the TCU commands a reacting torque which then causes the wind turbine to run at a certain speed for the given wind conditions. The relationship between torque, or power, and speed in a wind turbine is referred to as a power curve as is shown in FIG. 2. In this implementation, the power curve is stored in the TCU 132 and torque commands are passed from the TCU 132 to the GCU 122 over a communication link 146. Electrical power is passed to the rectifier 114, which contains six passive diode elements 147. The generator could be of a higher phase count than three phases in which case the number of diode elements 147 would have to increase or decrease in a corresponding manner. As an example, a two-phase generator would require 4 diode elements, and a six-phase generator would require 12 diode elements. The inverter 136 consists of six switching elements 160 as shown. In FIG. 3 these are shown as IGBT devices with integral flyback diodes. The switching elements could easily be SCRs, GTOs, or MOSFETs, or other self-commutated semiconductor devices. The inverter also may contain a DC inductor 158 and/or DC capacitor 156, which form a filter to smooth out the ripple current from the generator/rectifier and provide a low impedance DC bus for power semiconductor switching. A Line filter 124 may be used to remove or reduce harmonic content in the AC grid connections. A number of different filter configurations are possible including a simple series AC reactor and a more complicated inductor-capacitor-inductor pi filter, as well as many others. AC grid voltage measurement 164 and current measurement 162 are used by the GCU for purposes of synchronizing the inverter to the AC grid. Finally the DC bus voltage is measured 148 and is used by the GCU to determine certain fault status and to provide the active main-shaft damping as will be discussed later. The DC current out of the rectifier is measured 166 for purposes of regulating the DC current and for controlling the generator torque. A measurement of DC current may not be necessary in one implementation wherein the current is estimated in real time by dividing the DC power by the DC voltage to obtain the DC current. The advantage of this approach is that it eliminates a DC current sensor, thus providing a more reliable system.

Figure 4:
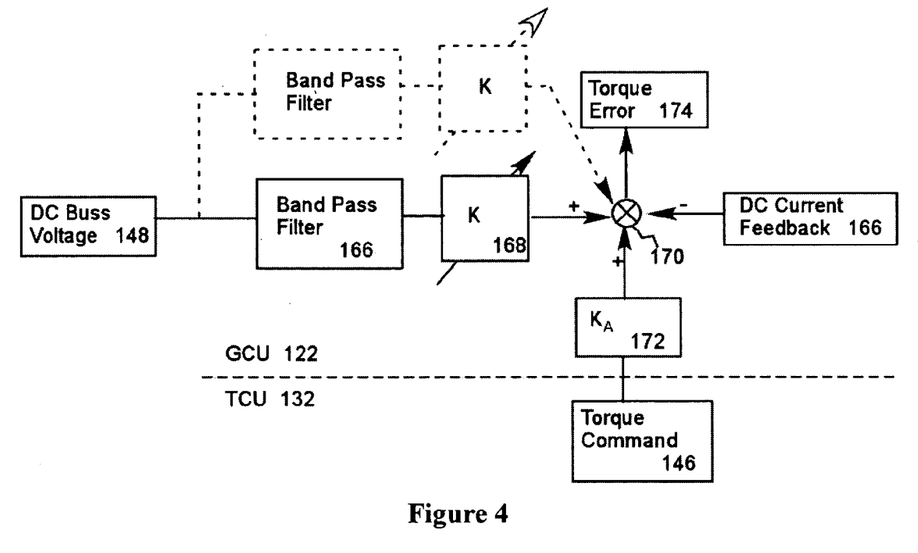
FIG. 4 is a block diagram of the main-shaft damping filter.

FIG. 4 is a block diagram showing the algorithm executed in software of a main-shaft damping filter. The main-shaft-damping filter is performed as shown in the GCU 122. The GCU has software, which contains a bandpass filter 166, which is tuned at the main-shaft resonant frequency. This frequency is typically in the range of 2–7 Hz. depending upon machine size, inertias, and main-shaft stiffness. The input to the bandpass filter is the DC bus voltage measurement 148 and the output of the filter is transmitted to a gain block 168 with optionally adjustable gain. The intention of adjustable gain is to allow tuning to be performed on individual wind turbines. The output of the gain block is passed to a summing junction 170 where it is added to the torque command, which arrives from the TCU over the communication link 146. The torque command is converted to a current command by a gain block 172. Also summed at this point is DC current feedback 166. The result of the summing junction 170 is a torque error 174 which is further processed in the GCU to bring the DC current up or down depending upon the magnitude and sign of the error signal. In wind turbines where multiple resonant modes are possible, multiple bandpass filters, each tuned at corresponding resonant frequencies and then summed at the summing junction are possible to suppress multiple modes. This is shown in dotted lines in FIG. 4. One such situation is one wherein the generator's high-speed shaft resonant frequency, at around 15 Hz, is significant and requires damping.

Figure 5:
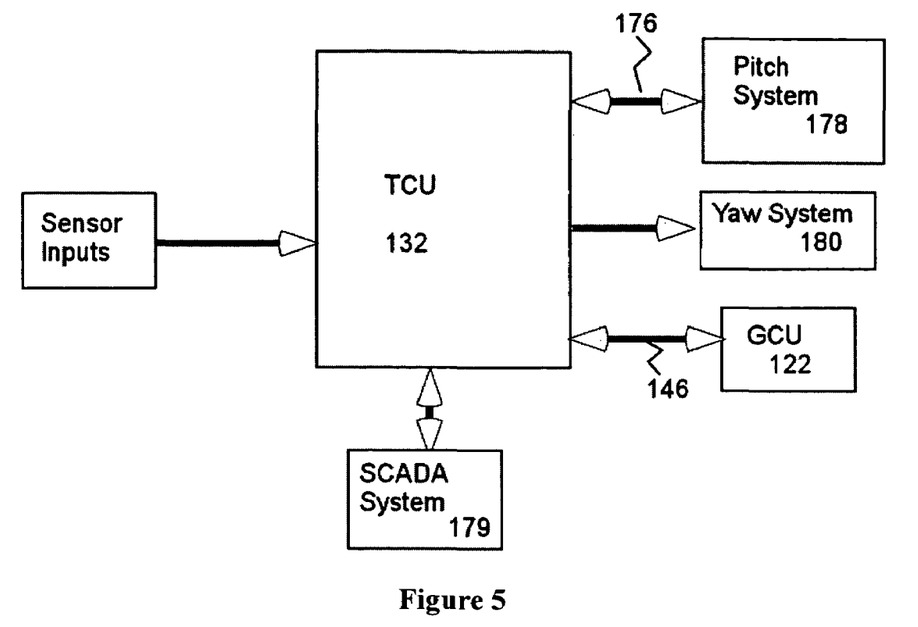
FIG. 5 is a representation of the TCU with its inputs and outputs.

FIG. 5 is a representation of the role of the TCU 132. The TCU 132 takes sensor information such as turbine speed, blade pitch angle, tower acceleration (vibration), nacelle acceleration (nacelle vibration), wind speed, wind direction, wind turbulence, nacelle position, AC line parameters, DC bus voltage, generator voltage, power output, or other fault related sensors. The TCU 132 has control of the two principle actuators on the turbine: the generators via the GCU 122, and the pitch system (PCU) 178. The TCU 132 performs a complicated, coordinated control function for both of these elements, and does so in a way, which maximizes the energy capture of the turbine while minimizing the machine's mechanical loads. A detailed description of this operation based on turbine operating regime is presented below. Finally, the TCU 132 also controls the yaw system 180, however, since this system responds very slowly to changing wind direction, the system operation is straightforward and works to keep the turbine always pointed into the wind. The TCU 132 is also in communication with the turbine's SCADA system 179 in order to provide and receive sensor and status information.

The control of the turbine is accomplished by varying the turbine blade pitch and generator torque to achieve two primary objectives:

First, in Zone 2 of the turbines power curve, (see FIG. 2) the blade pitch angle and the turbine tip-speed-ratio are held constant or nearly constant to provide maximum power output from the turbine. Constant tip-speed ratio simply means that the rotational speed goes up proportionally to the wind speed. This is accomplished by varying the torque to control the rotor speed so that it tracks the variation in the wind speed. On average, the torque follows a quadratically increasing function of either rotor speed or wind speed. The pitch angle is set to a fixed value in this zone, which corresponds to the maximum aerodynamic energy capture of the blade.

Second, in zone 3 of the power curve, (see FIG. 2) the desired generator torque and rotor speed are constant values giving a constant average output power. This control is accomplished by holding generator torque fixed and varying the blade pitch angle to regulate the rotor speed deviations from the desired value under varying wind speed conditions.

The algorithms used to accomplish these control objectives can be based on either classical single loop control methods (see e.g. E. A. Bossanyi, "Developments in Closed Loop Controller Design for Wind Turbines", *Proc.* 2000 *ASME Wind Energy Symp.*, Reno, Nev., Jan. 10–13, 2000 (AIAA-2000-0027), pp. 64–74, incorporated herein by reference) or more advanced state space control methods (see e.g. A. Wright and M. Balas, "Design of State-Space-Based Control Algorithms for Wind Turbine Speed Regulation," *Proc.* 2002 *ASME Wind Energy Symp.*, Reno, Nev., Jan. 14–17, 2002, (AIAA-2002-0052), pp. 299–309, incorporated herein by reference). In either case, the two control input variables, blade pitch and generator torque depend on the past history of the measured rotor speed as well as measured or computed values of the blade pitch angle and generator torque controls.

Figure 6:
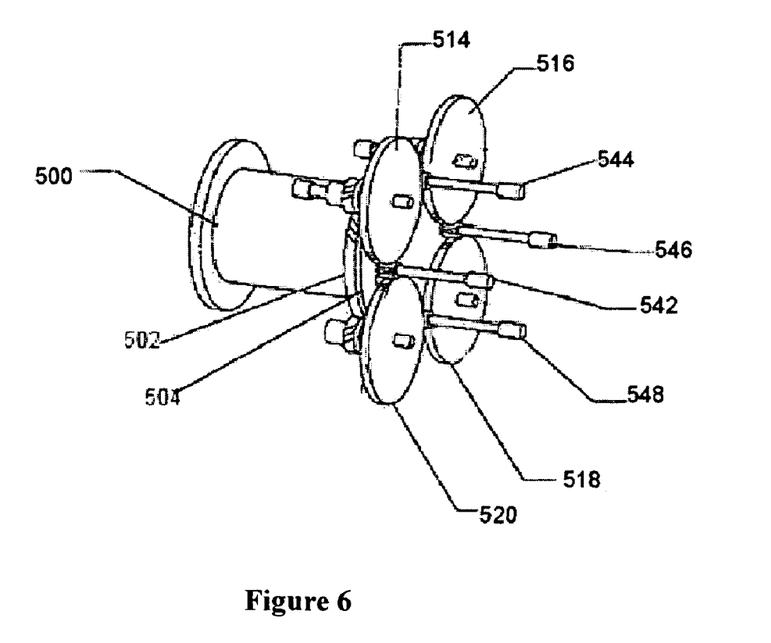
FIG. 6 is a figure showing the distributed drive train with four high-speed shafts; and, FIG. 7 is a figure showing the Dynamic VAR control system.

The gearbox shown in FIG. 6 is disclosed in the above-identified copending U.S. patent application Ser. No. 10/449,342. The main shaft 500 transmits torque to a pair of bull gears, 502, 504. A number of intermediate gears 514, 516, 518, 520 are located around a perimeter of the bull gears. A plurality of high-speed output shafts 542, 544, 546, 548 engage adjacent intermediate gears. Since each intermediate gear (e.g. 514) engages with two output shafts 542, 544, significant size reduction of the intermediate gears 514, 516, 518, 520 and the output shafts 542, 544, 546, 548 results. Adjacent pairs of intermediate gears 514, 516, 518, 520 drive the output shafts 542, 544, 546, 548, resulting in torque sharing of a high-speed stage comprised of two intermediate gears and one output shaft. Tooth pressure between intermediate gears 514, 516, 518, 520 and output shafts 542, 544, 546, 548 is unidirectional, that is, not reversing, allowing higher loads than other systems such as planetary gear systems. A generator is connected to each output shaft. The generators can be stand alone systems with external couplings or fully integrated with the high speed output shafts 542, 544, 546, 548 shown in FIG. 6. The torque on the low speed stage is also split through a double helix bull gear (502) with uneven helix angle matching the low speed pinions (510).

What has been described is a variable speed wind turbine employing a turbine rotor connected to a distributed generation drive train gearbox and two or more synchronous generators with wound field or permanent magnet rotors. A passive rectifier is included for each generator along with one or more inverters used to convert the DC power back to constant frequency AC for utility grid interconnection.

A Turbine Control Unit (TCU) and Generator Control Unit (GCU) command the proper generator torque required based on the rotor speed and power output of the turbine inverter system as well as providing any active damping requirements. Torque control is accomplished through inverter current commands generated by the TCU and GCU. In high winds the turbine remains at a constant average output power through a constant torque command from TCU and GCU and the TCU provides a varying pitch command to the hub mounted pitch servo system.

These control commands can be independent or can be a part of State Space Control presentation. In this circumstance, the torque and speed are a subset of the turbine state space that include other parameters such as pitch rate, pitch acceleration and various turbine loads.

Figure 7:
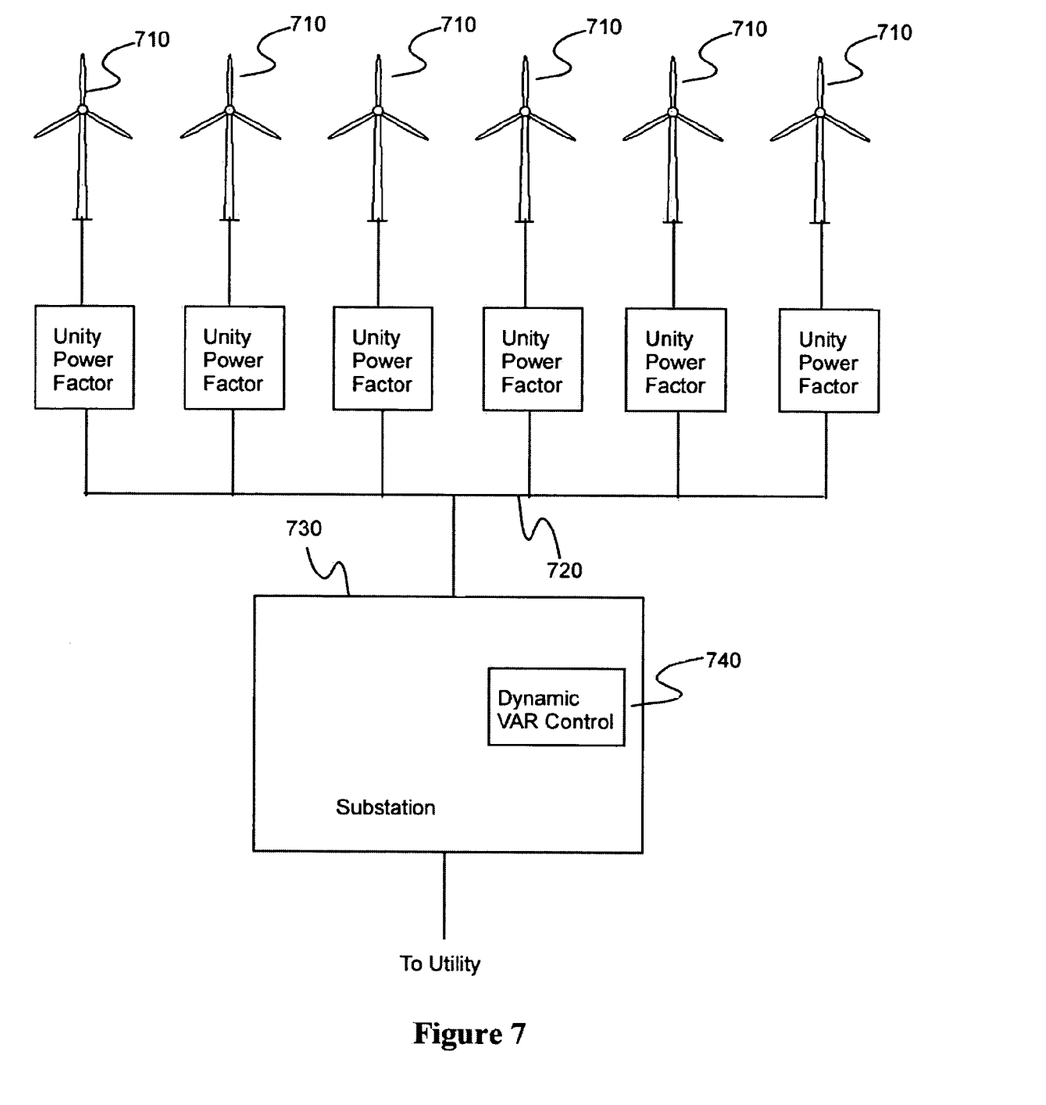

As shown in FIG. 7, a wind turbine farm, under-water turbine farm, other fluid-flow farm, or other source of energy turbine farm can be installed using turbines according to the present invention with advantageous power factor control. The wind farm consists of a multiplicity of individual wind turbines 710, each of which has a synchronous generator, a passive rectifier, and an inverter. VAR control is fixed at the inverter output. A preferred method is to fix this set point such that the output VAR load is at a minimum. This requires that the power factor be set to unity. Alternately, the VAR load can be set to provide a slight leading power factor to help compensate for any external transformer VAR's. In either case, this power factor is fixed and not adjusted dynamically. AC power is transmitted from the individual wind turbines 710 through an electrical collection system 720. The collection system can include underground and/or overhead electrical conductors, transformers, junction boxes, filters, and a variety of other electrical devices. Power transmitted through the collection system 720 is at substantially unity power factor. The power from the wind farm is collected at a substation 730. Any VAR control necessary on a wind farm basis is provided at the substation level or alternately can be located in sub-modules distributed throughout the wind farm itself. The advantage of having a unity power factor is that less current is required for a given power output thereby lowering the losses that are incurred when the power factor is not set to unity. This reduces the size requirements for conductors, transformers, and other equipment in a wind farm's electrical collection system 720. The substation 730 includes a dynamic VAR controller 740 to provide power to the utility at the power factor required by the utility.

From the above description, it will be apparent that the invention disclosed herein provides a novel and advantageous variable speed wind or water turbine. The forgoing discussion discloses and describes merely exemplary methods and embodiments of the present invention. As will be understood by those familiar with the art, the invention may be embodied in other specific forms without departing from the spirit or essential characteristics thereof. For example, special staging algorithms for generators may be devised as dictated by specific generator equipment rather than the algorithm approaches identified herein. Furthermore several inter-related features have been described and it is intended that each feature be included within the scope of the patent in relation to the other features, independently, or as a feature of a different system. For instance, active damping of main-shaft vibrations may be employed on a turbine without multiple generators or with a different power electronics or control configurations. Therefore, it is intended that the invention not necessarily be limited to the particular embodiments described and illustrated herein.

The invention has been described with reference to a circular gear having gear teeth around a perimeter of said circular gear, the circular gear being coupled to a main input shaft that is driven by a source of energy. It will be understood by those skilled in the art that the main input shaft may be fitted directly onto the circular gear, or the main input shaft may be indirectly linked to the circular gear. For example, a reciprocating main input shaft that imparts rotational motion to said circular gear or the main input shaft may be combined with other gears or linkages to impart rotational motion to said circular gear.

It will also be understood by those skilled in the art that whereas the invention is described with reference to wind or water current sources of power, and wind or water farms, other sources of power may be utilized to impart torque to the main input shaft: fossil fuels, such as diesel motor-generator sets and gas turbines; nuclear fuels, such as steam turbines for nuclear power plants; solar energy; bio-energy technologies, such as making use of renewable plant material animal wastes; and industrial waste; thermal energy; automotive energy, such as electric cars; tunnel boring equipment; mining equipment; micro-turbines, such as those using natural gas, gas from landfills or digester gas; marine drives; and heavy equipment with a low speed drive.

While the invention has been particularly shown and described with reference to preferred embodiments thereof, it will be understood by those skilled in the art that the foregoing and other changes in form and detail may be made therein without departing from the scope of the invention.

What is claimed is:

1. An electric power-generating device comprising:
a main input shaft rotated by a source of energy;
one or more sensors, an output thereof being sensor information;
a synchronous generator selected from a group consisting of wound field synchronous generators wherein an exciter field is excited with a constant current and permanent magnet synchronous generators, said synchronous generator being operatively connected to said main input shaft, an output of said synchronous generator being AC electrical power;
a rectifier connected to said output of said synchronous generator, an output of said rectifier being DC electrical power;
an active inverter capable of regulating DC current, said active inverter having a first input, a second input, and an output, said first input being connected to said output of said rectifier; and,
a control unit connected to said one or more sensors and to said second input of said active inverter, said control unit capable of causing said active inverter to regulate said DC current of said active inverter in accordance with said sensor information.

2. The electric power-generating device of claim 1 wherein said device includes a plurality of synchronous generators operatively connected to said main input shaft.

3. The electric power-generating device of claim 2 wherein said control unit brings each generator of said plurality of synchronous generators online sequentially in the event of low energy conditions of said source of energy to improve system efficiency at low power.

4. The electric power-generating device of claim 3 wherein said control unit alternates the sequence in which said control unit shifts the order in which said generators are brought online such that each generator receives similar utilization.

5. The electric power-generating device of claim 1 wherein electric power-generating device is a wind turbine that includes said generator and said rectifier, said wind turbine being located at the top of a tower and wherein said inverter is located at the bottom of said tower.

6. The electric power-generating device of claim 5 wherein a set of power cables conduct electrical power from the top of said tower to the bottom of said tower and wherein said power cables conduct DC electrical power.

7. The electric power-generating device of claim 6 wherein said set of power cables consist of two cables per generator.

8. The electric power-generating device of claim 1 wherein said rectifier comprises a plurality of diodes that convert AC electrical power into DC electrical power.

9. The electric power-generating device of claim 8 wherein said generator is a three-phase synchronous generator and wherein said rectifier comprises six diodes.

10. The electric power-generating device of claim 1 wherein said control unit controls generator torque by regulating the current in said DC electrical power.

11. The electric power-generating device of claim 10 wherein the voltage of said DC electrical power is measured and used as an input to said control unit.

12. The electric power-generating device of claim 11 further comprising a band pass filter for said measured voltage of said DC electrical power that is tuned to measure vibrations in mechanical portions of said electric power-generating device at a predetermined resonant frequency and wherein said control unit provides a generator torque signal to said inverter that cancels and dampens said vibrations.

13. The electric power-generating device of claim 1 wherein said control unit measures vibrations in mechanical portions of said electric power-generating device and controls generator torque to actively dampen said vibrations.

14. The electric power-generating device of claim 13 wherein said control unit measures said vibrations by measuring the voltage of said DC electrical power.

15. The electric power-generating device of claim 14 further comprising a band pass filter in said control unit to filter said measured voltage of said DC electrical power to a predetermined frequency that corresponds to a mechanical resonance in said mechanical portions of said electric power-generating device.

16. A fluid-flow turbine comprising:
a blade for converting fluid-flow power into mechanical power;
one or more sensors, an output thereof being sensor information;
a plurality of synchronous generators selected from the group consisting of wound field synchronous generators wherein an exciter field is excited with a constant current and permanent magnet synchronous generators, said synchronous generators being operatively connected to said blade for converting said mechanical power into fixed-frequency utility-connected AC electrical power;
a plurality of rectifiers electrically connected to each of said synchronous generators for converting said AC electrical power of each synchronous aenerator into DC electrical power;
a plurality of active inverters electrically connected to each of said plurality of rectifiers to convert said DC electrical power of each of said plurality of rectifiers into AC electrical power, each active inverter capable of regulating DC electrical current; and,
a control unit connected to said one or more sensors and to said active inverters, said control unit capable of causing each of said active inverters to regulate said DC current of said active inverters in accordance with said sensor information.

17. The electric power-generating device of claim 16 wherein said control unit brings each generator online sequentially in low fluid-flow conditions to improve system efficiency at low power.

18. The electric power-generating device of claim 17 wherein said control unit alternates the sequence in which said control unit shifts the order in which said generators are brought online such that each generator receives similar utilization.

19. A fluid-flow farm comprising:
a plurality of fluid-flow turbines each of which includes a synchronous generator coupled to a rectifier and an inverter, an output of said inverter being connected to a transformer, wherein reactive power control is fixed at said output of said inverter so that power factor is unity or set to provide a leading power factor that compensates for VAR of said transformer;
an electrical collection system electrically connected to each of said fluid-flow turbines, said electrical collection system having an output, which is an aggregate output of said fluid-flow farm, said output being connected to a substations wherein said electrical collection system is sized for operation of said fluid-flow turbines at unity power factor; and,
a dynamically adjustable power factor controller at said substation for adjusting the power factor of said aggregate output of said fluid-flow farm.

20. A fluid-flow farm comprising:
a plurality of fluid-flow turbines each of which includes one or more synchronous generators, each coupled to a rectifier and an inverter, an output of said inverter being connected to a transformer, wherein VAR control is fixed at said output of said inverter such that a VAR load is set between and a leading power factor to compensate for the VAR of said external transformer and unity power factor, inclusive;
each one of said fluid-flow turbines comprising a blade which converts fluid-flow power into mechanical power, said one or more synchronous generators being selected from a group consisting of wound field synchronous generators wherein an exciter field is excited with a constant current and permanent magnet synchronous generators, said synchronous generators being operatively connected to said blade;
an electrical collection system electrically connected to each of said fluid-flow turbines and to a substation, wherein said electrical collection system is sized for operation of said fluid-flow turbines at unity power factor; and,
a dynamically adjustable power factor controller at said substation for adjusting the power factor of the aggregate output of said fluid-flow farm.

21. An apparatus for generating electric power comprising:
first means for converting fluid-flow power into rotational mechanical power;
sensor means for providing sensor information;
a plurality of synchronous generators selected from a group consisting of wound field synchronous generators wherein an exciter field is excited with a constant current and permanent magnet synchronous generators, said synchronous generator being connected to said first means for converting said mechanical power into AC electrical power;
rectifying means connected to said plurality of generators for rectifying outputs of said generators to thereby convert said AC electrical power of said generators into DC electrical power;
inverting means connected to said rectifying means for inverting said DC electrical power to thereby convert said DC electrical power to AC electrical power said inverting means being capable of regulating DC electrical current; and,
control means connected to said sensing means and to said inverting means, for causing said inverting means to regulate said DC electrical current in accordance with variations in said sensor information.

22. The apparatus of claim 21 further comprising:
further means in said control means for bringing each of said generators online sequentially in low fluid-flow conditions to improve system efficiency at low power.

23. The apparatus of claim 22 wherein the order in which said generators are brought online is such that each generator receives similar utilization.

24. An apparatus for generating electric power comprising:
a transformer:
a plurality of fluid-flow turbines, each of which includes a synchronous generator coupled to a rectifier and an inverter, an output of said inverter being connected to said transformer, wherein reactive power control is fixed at said output of said inverter so that power factor is unity or set to provide a leading power factor that compensates for VAR of said transformer;
a substation;
an electrical collection system electrically connecting each of said fluid-flow turbines to said substation;
said electrical collection system being sized for operation of said fluid-flow turbines at unity power factor; and
means at said substation for dynamically adjusting the power factor of the aggregate output of said plurality of fluid-flow turbines.

25. A apparatus for generating electric power comprising:
a plurality of fluid-flow turbines, each of which utilizing a blade to drive synchronous generators selected from a group consisting of wound field synchronous generators wherein an exciter field is excited with a constant current and permanent magnet synchronous generators, said synchronous generators converting fluid-flow power into AC electrical power at unity power factor;
converting means associated with each turbine for converting said AC electrical power of said synchronous generators into DC electrical power;
means for inverting said DC electrical power of each said synchronous generators of a turbine to thereby convert said DC electrical power to AC electrical power;
an electrical collection system for electrically connecting each of said fluid-flow turbines to a substation wherein said electrical collection system is sized for operation of said fluid-flow turbines at unity power factor; and,
means for dynamically adjusting the power factor of the aggregate output of said plurality of fluid-flow turbines at said substation.

26. The apparatus of claim 25 further comprising:
a number of towers, one for each of said plurality of turbines;
each turbine and an associated converting means being located on top of one of said towers; and,
said means for inverting being located at a bottom of said tower.

27. The apparatus of claim 26 further comprising:
means for conducting DC electrical power from said converting means at said top of said tower to said inverting means at said bottom of said tower.

28. A method of generating electric power comprising steps of:
A. converting fluid-flow power into mechanical power;
B. providing sensor information;
C. utilizing a plurality of generators selected from a group consisting of wound field synchronous generators wherein an exciter field is excited with a constant current and permanent magnet synchronous generators to convert said mechanical power into AC electrical power;
D. rectifying outputs of said generators to thereby convert said AC electrical power of said generators into DC electrical power;
E. inverting said DC electrical power at an inverter to thereby convert said DC electrical power to AC electrical power; and,
F. regulating DC electrical current at said inverter in accordance with variations in said sensor information.

29. The method of claim 28 further comprising a step of:
E. bringing each of said generators online sequentially in low fluid-flow conditions to improve system efficiency at low power.

30. The method of claim 29 wherein in said step E the order in which said generators are brought online is such that each generator receives similar utilization.

31. A method of generating electric power comprising steps of:
A. providing a plurality of fluid-flow turbines that include synchronous generators selected from a group consisting of wound field synchronous generators wherein an exciter field is excited with a constant current and permanent magnet synchronous generators, said generators converting fluid-flow power into AC electrical power at a power factor fixed between a leading power factor to compensate for the VAR of an external transformer and a unity power factor, inclusive;
B. electrically connecting each of said fluid-flow turbines via an electrical collection system to a substation wherein said electrical collection system is sized for operation of said fluid-flow turbines at unity power factor; and
C. dynamically adjusting the power factor of the aggregate output of said plurality of fluid-flow turbines at said substation.

32. A method of generating electric power comprising steps of:
A. providing a plurality of fluid-flow turbines, each of which utilizing a blade to drive synchronous generators selected from a group consisting of wound field synchronous generators wherein an exciter field is excited with a constant current and permanent magnet synchronous generators, said generators converting fluid-flow power into AC electrical power at unity power factor;
B. rectifying outputs of each said synchronous generators of a turbine to thereby convert said AC electrical power of said synchronous generators into DC electrical power;
C. inverting said DC electrical power of each said synchronous generators of a turbine to thereby convert said DC electrical power to AC electrical power;
D. electrically connecting each of said fluid-flow turbines via an electrical collection system to a substation wherein said electrical collection system is sized for operation of said fluid-flow turbines at unity power factor; and,
E. dynamically adjusting the power factor of the aggregate output of said plurality of fluid-flow turbines at said substation.

33. The method of claim 32 wherein:
said step A of providing a plurality of fluid-flow turbines includes the step of providing a plurality of towers with each one of said turbines on top of one of said towers;
said step B of rectifying outputs of each said generators is performed at said top of said one tower; and,
said step C of inverting said DC electrical power of each said synchronous generators of a turbine to thereby convert said DC electrical power to AC electrical power is performed at a bottom of said one tower.

34. The method of claim 33 further comprising a step of:
F. conducting DC electrical power from said top of one tower to said bottom of said one tower prior to said step C of inverting said DC electrical power of each said synchronous generators of a turbine.

35. A variable speed wind turbine comprising:
a turbine rotor including at least one blade mounted on a rotatable shaft;
a synchronous generator selected from the group consisting of wound field synchronous generators wherein an exciter field is excited with a constant current and permanent magnet synchronous generators,
said synchronous generator being coupled to said turbine shaft for rotation therewith;
a sensor, an output of which is sensor information;
a power converter including an active inverter having switches that can be activated in response to inverter current commands in such a way as to vary DC current for phases of said generator; and,
a controller coupled to said sensor and to said inverter, an output of said controller being an inverter current command related to required generator torque.

36. The apparatus of claim 35 wherein:
said inverter current command commands required generator torque based on rotor speed and power output of said inverter.

* * * * *